P. S. LARSON.
SEPARABLE RIM.
APPLICATION FILED MAR. 18, 1915.
1,161,698.
Patented Nov. 23, 1915.
2 SHEETS—SHEET 1.
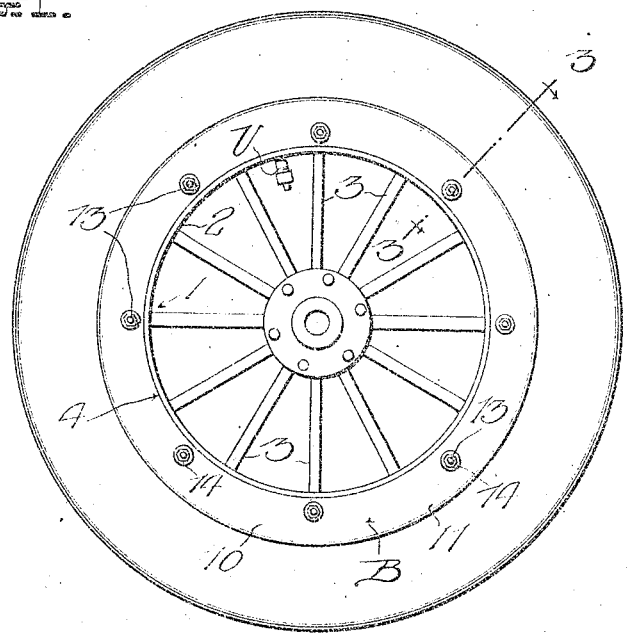
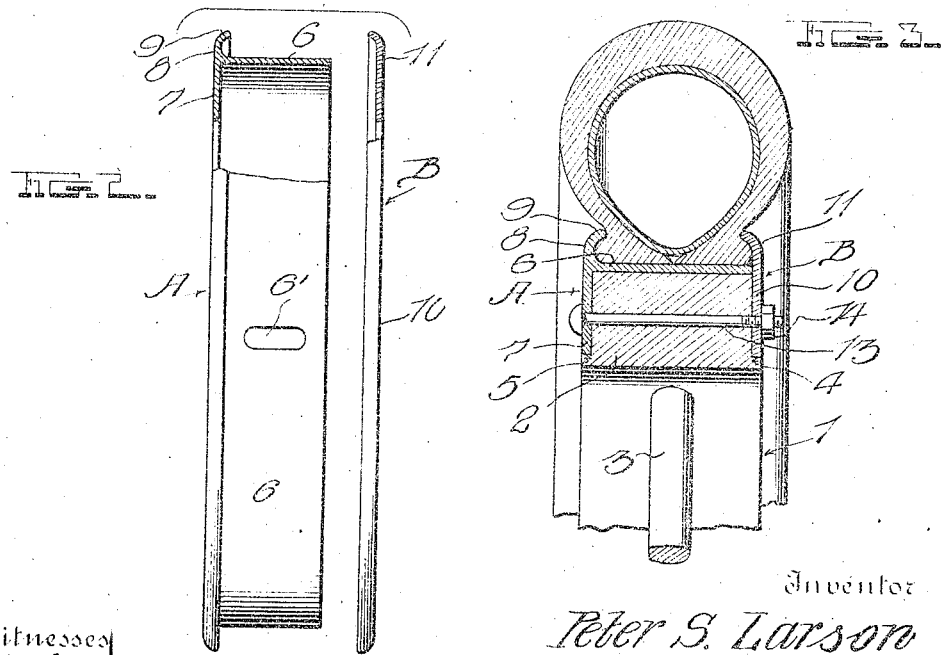
Witnesses
H. Woodard
Inventor
Peter S. Larson
by
Attorneys P. S. LARSON.
SEPARABLE RIM.
APPLICATION FILED MAR. 18, 1915.
1,161,698.
Patented Nov. 23, 1915.
2 SHEETS—SHEET 2.
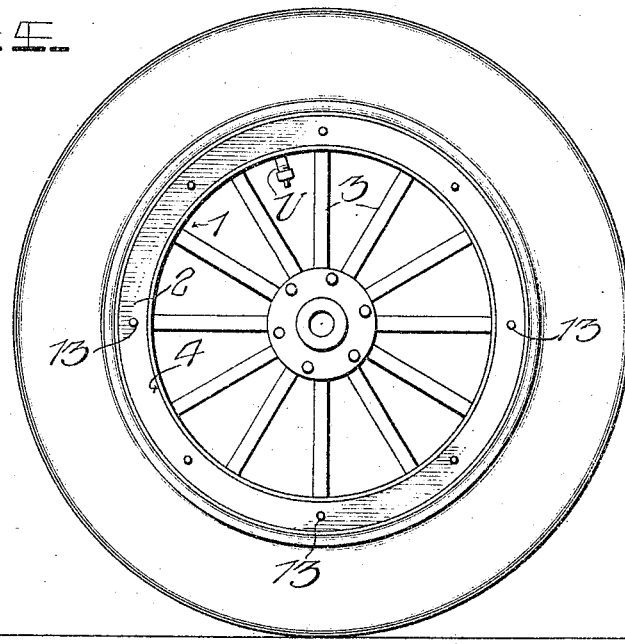
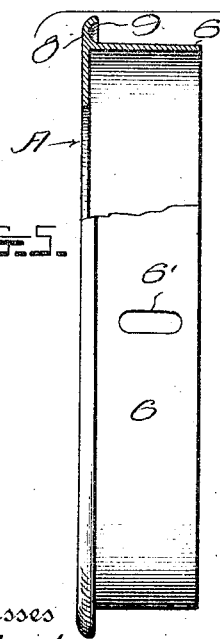
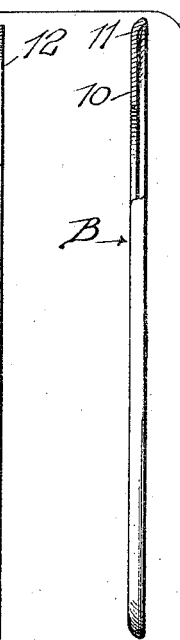
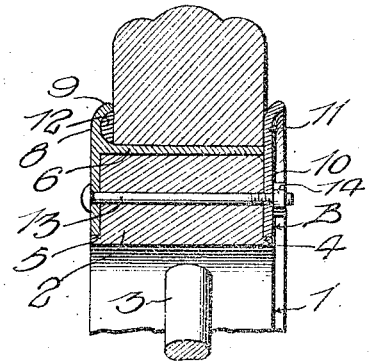
Witnesses
H Woodard
Inventor
Peter S. Larson
by H. B. Willson &co
Attorneys

UNITED STATES PATENT OFFICE.

PETER S. LARSON, OF BELOIT, WISCONSIN, ASSIGNOR OF ONE-HALF TO JOEL B. DOW, OF BELOIT, WISCONSIN.

SEPARABLE RIM.

1,161,698.  Specification of Letters Patent.  Patented Nov. 23, 1915.

Application filed March 18, 1915.  Serial No. 15,363.

*To all whom it may concern:*

Be it known that I, PETER S. LARSON, a citizen of the United States, residing at Beloit, in the county of Rock and State of Wisconsin, have invented certain new and useful Improvements in Separable Rims; and I do declare the following to be a full, clear, and exact description of the invention, such as will enable others skilled in the art to which it appertains to make and use the same.

This invention relates to improvements in separable rims adapted for use in connection with vehicle wheels equipped with tires of the pneumatic type.

The primary object of the invention is to provide a sectional rim by means of which the positioning or removing of a pneumatic tire will be greatly facilitated and which may be used either in connection with a straight tire or with a tire of the clencher type.

Another object of the invention is to provide a rim of this character which while simple and economical in construction is very light and strong and is so positioned and held on the felly of a wheel that no skidding or sliding sidewise of the rim can take place.

Another object is to so construct a rim of this character that it will reinforce and strengthen the felly of the wheel to which it is applied and at the same time greatly facilitate the removal and replacement of a tire when necessary.

With these and other objects in view, the invention consists of certain novel features of construction, and the combination and arrangement of parts as will be more fully described and claimed.

In the accompanying drawings: Figure 1 is a side elevation of a wheel equipped with this improved rim; Fig. 2 is an edge view of the rim detached with the parts arranged in juxtaposition ready for assembling; Fig. 3 is a transverse section taken on the line 3—3 of Fig. 1 showing the rim applied to a clencher tire; Fig. 4 is a side portion of a wheel equipped with this improved rim with one of the members of said rim removed showing the device ready for slipping off the tire; Fig. 5 is an edge view showing the parts in juxtaposition ready for assembling when the device has been used in connection with a straight-walled tire, and Fig. 6 is a transverse section through the wheel and tire.

In the embodiment illustrated a wheel 1 is shown provided with a wooden felly 2 to which the spokes 3 are attached in the usual manner. On the opposite side faces of this felly 2 adjacent the inner portion thereof are arranged two annular shoulders 4 and 5 which are designed to form seats for receiving the rim constituting this invention and also to afford stops for limiting the inward movement of said rim when applied.

The rim constituting this invention comprises a section A comprising an annular band 6 of a width corresponding substantially to the peripheral portion of the felly 2 between the shoulders 4 and 5 thereof. This band 6 is provided on one edge with an inwardly extending radial flange 7 of a width corresponding to the distance between the periphery of the felly 2 and the outer face or periphery of one of the shoulders thereof so that when said section is applied to the felly this band will rest on its periphery with the inner edge of the flange 7 seated on the shoulder 5, as is shown clearly in Fig. 3, the outer face of said flange extending flush with the outer face of said shoulder.

Projecting beyond the band 6 substantially in alinement with the flange 7 is a peripheral flange 8 here shown constructed in accordance with the well known clencher type of rim having an inturned hook 9 to receive the bead projection carried by a clencher tire. The other section B of this improved rim comprises an annular plate 10 of a width corresponding to the width of the flange 7 of the other section and which is adapted to be disposed on the side of the felly opposite to that on which the flange 7 is disposed when the parts are assembled, and to be seated with its lower edge in engagement with the shoulder 4 formed on said felly, the outer face of said plate being arranged flush with the outer face of said shoulder. This plate 10 is provided at its peripheral edge with a hook-like radially extending flange 11 which projects beyond the periphery of the felly and the band 6 of the other section being of a length corresponding to the length of the flange 8 of said other section and adapted to coöperate therewith for securing a tire in position between them. This plate 10 is reversible to adapt the rim to be used either in connection with a tire of the clencher type or with a straight tire. When it is used in connection with a straight tire the hook-shaped flange 11 thereof is disposed outwardly as shown in Figs. 5 and 6 and a filling member 12 is shown mounted in the recess in the inner face of the flange 8 of the other section, thus presenting two straight flat opposed walls between which a straight pneumatic tire is designed to be mounted. When this rim is to be used for securing a tire of the clencher type, the hook 11 is disposed inwardly and the annular member 12 is removed from the rim as shown in Figs. 2 and 3 and the tire may then be readily clamped between the hooks 9 and 11 of said rim which engage beads on the opposite sides of the tire, as shown in Fig. 2. These rim sections A and B are secured to the felly 2 by a plurality of bolts 13 which extend transversely through the flanges 7 and 10 of the sections and through said felly and are secured in operative position by the usual nuts 14. While eight of these bolts are herein shown spaced equal distances apart, it is obvious that any desired number may be employed, and when said sections are so disposed and clamped they will be held reliably in engagement with the opposite side faces of the felly 2 and thereby form not only rim securing means, but felly reinforcing plates.

In the practical use of this rim when a tire becomes punctured or it is desired to remove one for any other purpose, all that is necessary is to loosen the nuts 14 and slide off the section B, leaving section A in position on the felly. The tire may then be readily slipped off sidewise and readily repaired or replaced by a new one, and after a new tire has been replaced, the section B is reëngaged with the bolts 13 and the nuts 14 are inserted on said bolts, thereby clamping the rim and tire in operative position on the wheel. These bolts 14 are preferably spaced equal distances apart to facilitate the application of the section B so that when one aperture in said section is engaged with one of the bolts, the other apertures therein will be automatically positioned in engagement with the other bolts, thereby avoiding the necessity of locating the respective bolts with relation to certain apertures.

One of the essential features of this invention is the facility with which a punctured tire may be removed and a new one inserted even by a novice, and the reversibility of the removable plate of the rim to provide for the use of the rim in connection with either straight or clencher tires.

The flanges 7 and 8 of the section A are shown made integrally with the band 6, thereby greatly strengthening and reinforcing both the top and one side of the felly and thus eliminating the danger of spokes being broken out resulting from split rims. The band 6 of section A is provided with a transversely extending slot 6' for the passage therethrough of the inflation valve V carried by the pneumatic tire.

I claim as my invention:

The combination with a felly, of a sectional rim on said felly and comprising a section in the form of an annular band for engaging the periphery of said felly and of a width corresponding to the width of said felly at its periphery, a radial flange extending inwardly from one edge of said band and adapted to contact with one side of the felly, and a peripheral flange extending radially beyond said band in alinement with said first mentioned flange and having an inturned edge to form a semicircular tire bead engaging member with the groove on its inner face, the other section of said rim comprising an annular plate corresponding in width to the combined width of the flanges of said first mentioned section and having a semicircular flange on its peripheral edge corresponding to the peripheral flange of the other section, said plate being adapted to have its inner portion contact with the opposite side of the felly, bolts connecting said sections and felly, and an annular filler to fit the groove of the band carried section, said filler being semicylindrical in cross section.

In testimony whereof I have hereunto set my hand in presence of two subscribing witnesses.

PETER S. LARSON.

Witnesses:
 JOEL B. DOW,
 J. S. DOW.